US010169457B2

(12) United States Patent
Miller et al.

(10) Patent No.: US 10,169,457 B2
(45) Date of Patent: Jan. 1, 2019

(54) DISPLAYING AND POSTING AGGREGATED SOCIAL ACTIVITY ON A PIECE OF ENTERPRISE CONTENT

(71) Applicant: MICROSOFT TECHNOLOGY LICENSING, LLC, Redmond, WA (US)

(72) Inventors: Robin Miller, Oslo (NO); Stefan Debald, Fjerdingby (NO); Viral Shah, Oslo (NO); Joshua Stickler, Oslo (NO); Fredrik Holm, Oslo (NO); Ashok Kuppusamy, Oslo (NO); Øyvind Linna Eikeland, Oslo (NO); Mathuranthagaa Selvarathnam, Oslo (NO); Marcin Łukasz Roman, Oslo (NO); Colamba Patabedige Janaka Chathuranga Perera, Oslo (NO); Bjørnstein Lilleby, Tromsø (NO); Rune Devik, Tromsø (NO); Sangram Jyoti Bal, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/195,184

(22) Filed: Mar. 3, 2014

(65) Prior Publication Data
US 2015/0248480 A1    Sep. 3, 2015

(51) Int. Cl.
G06F 17/30    (2006.01)
G06Q 10/10    (2012.01)
G06Q 50/00    (2012.01)

(52) U.S. Cl.
CPC .... *G06F 17/30864* (2013.01); *G06F 17/3053* (2013.01); *G06F 17/30958* (2013.01); *G06Q 10/10* (2013.01); *G06Q 50/01* (2013.01)

(58) Field of Classification Search
CPC ............... G06F 17/30; G06F 17/30864; G06F 17/30958; G06F 17/3053; G06Q 50/01; G06Q 10/10
See application file for complete search history.

(56) References Cited

U.S. PATENT DOCUMENTS 6,434,556 B1    8/2002  Levin et al.
7,031,961 B2    4/2006  Pitkow et al.
(Continued)

FOREIGN PATENT DOCUMENTS

EP    2426634 A1    3/2012
EP    2764489 A1    8/2014
(Continued)

OTHER PUBLICATIONS

Soussi, Rania, "Querying and Extracting Heterogeneous Graphs from Structured Data and Unstrutured Content", In Doctoral Dissertation, Ecole Centrale Paris, Jun. 22, 2012, 208 pages (1 page Abstract).
(Continued)

*Primary Examiner* — Leslie Wong
(74) *Attorney, Agent, or Firm* — Merchant & Gould

(57) ABSTRACT

A personalized view of insights into social activity surrounding a content item is provided that may indicate to a user why a given piece of content may be interesting to him/her. A user's activities, as well as the activities of others (e.g., colleagues of the user) may be shown, including such items as a total number of views, comments, followers, and likes associated with the content item. The insights view may be personalized based on the user's relationships with other users in association with the content item. The user may learn through the personalized view who among his/her relationships have commented, edited, shared, or liked the content item, as well as, how many of the user's colleagues have viewed the content item. In addition, through a search
(Continued)

function that may be applied to the view content, a user may learn about related content items based on the social insights.

20 Claims, 10 Drawing Sheets

(56) References Cited

U.S. PATENT DOCUMENTS

| | | |
|---|---|---|
| 7,055,168 B1 | 5/2006 | Errico et al. |
| 7,444,344 B2 | 10/2008 | Galindo-Legaria et al. |
| 7,509,320 B2 | 3/2009 | Hess |
| 7,571,121 B2 | 8/2009 | Bezos et al. |
| 7,577,718 B2 | 8/2009 | Slawson et al. |
| 7,587,101 B1 | 9/2009 | Bourdev |
| 7,640,236 B1 | 12/2009 | Pogue |
| 7,756,945 B1 | 7/2010 | Andreessen et al. |
| 7,761,447 B2 | 7/2010 | Brill et al. |
| 7,783,630 B1 | 8/2010 | Chevallier et al. |
| 7,788,245 B1 | 8/2010 | Eddings |
| 7,873,641 B2 | 1/2011 | Frieden et al. |
| 7,890,501 B2 | 2/2011 | Lunt et al. |
| 7,945,571 B2 | 5/2011 | Wanker |
| 7,958,116 B2 | 6/2011 | House et al. |
| 7,962,481 B2 | 6/2011 | Ganesh et al. |
| 8,005,817 B1 | 8/2011 | Amer-Yahia et al. |
| 8,060,513 B2 | 11/2011 | Basco et al. |
| 8,065,383 B2 | 11/2011 | Carlson et al. |
| 8,204,870 B2 | 6/2012 | Mukkamala et al. |
| 8,204,888 B2 | 6/2012 | Frieden et al. |
| 8,209,349 B2 | 6/2012 | Howes et al. |
| 8,214,325 B2 | 7/2012 | Navas |
| 8,266,144 B2 | 9/2012 | Tankovich et al. |
| 8,301,764 B2 | 10/2012 | Konig et al. |
| 8,312,056 B1 | 11/2012 | Peng et al. |
| 8,341,017 B2 | 12/2012 | Payne et al. |
| 8,341,150 B1 | 12/2012 | Riley et al. |
| 8,346,765 B2 | 1/2013 | Guo et al. |
| 8,346,950 B1 | 1/2013 | Andreessen et al. |
| 8,380,562 B2 | 2/2013 | Toebes et al. |
| 8,386,515 B2 | 2/2013 | Bent et al. |
| 8,463,795 B2 | 6/2013 | Van Hoff |
| 8,538,959 B2 | 9/2013 | Jin et al. |
| 8,600,981 B1 | 12/2013 | Chau et al. |
| 8,601,023 B2 | 12/2013 | Brave et al. |
| 8,751,621 B2 * | 6/2014 | Vaynblat et al. ............ 709/223 |
| 8,751,636 B2 | 6/2014 | Tseng et al. |
| 8,775,334 B1 | 7/2014 | Lloyd et al. |
| 8,782,036 B1 | 7/2014 | Chen et al. |
| 8,799,296 B2 | 8/2014 | Agapiev |
| 8,812,947 B1 | 8/2014 | Maoz et al. |
| 8,825,649 B2 | 9/2014 | Heimendinger et al. |
| 8,825,711 B2 * | 9/2014 | Chan et al. ............ 707/798 |
| 8,874,550 B1 | 10/2014 | Soubramanien et al. |
| 8,886,633 B2 * | 11/2014 | Smyth et al. ............ 707/721 |
| 8,909,515 B2 | 12/2014 | O'Neil et al. |
| 8,984,098 B1 | 3/2015 | Tomkins et al. |
| 8,996,631 B1 * | 3/2015 | Staddon et al. ............ 709/206 |
| 9,165,305 B1 | 10/2015 | Chandra et al. |
| 9,177,293 B1 | 11/2015 | Gagnon |
| 9,223,866 B2 * | 12/2015 | Marcucci et al. |
| 9,438,619 B1 | 9/2016 | Chan et al. |
| 9,514,191 B2 | 12/2016 | Solheim et al. |
| 9,542,440 B2 | 1/2017 | Wang et al. |
| 9,576,007 B1 | 2/2017 | Sivathanu |
| 2001/0034859 A1 | 10/2001 | Swoboda et al. |
| 2002/0038299 A1 | 3/2002 | Zernik et al. |
| 2002/0169759 A1 | 11/2002 | Kraft et al. |
| 2003/0025692 A1 | 2/2003 | Lu et al. |
| 2003/0071814 A1 | 4/2003 | Jou et al. |
| 2003/0115271 A1 | 6/2003 | Weissman |
| 2004/0255237 A1 | 12/2004 | Tong |
| 2004/0267736 A1 | 12/2004 | Yamane et al. |
| 2005/0076240 A1 | 4/2005 | Appelman |
| 2005/0076241 A1 | 4/2005 | Appelman |
| 2005/0201535 A1 | 9/2005 | LaLonde |
| 2005/0203929 A1 | 9/2005 | Hazarika |
| 2005/0246420 A1 | 11/2005 | Little |
| 2005/0278321 A1 | 12/2005 | Vailaya et al. |
| 2005/0278325 A1 | 12/2005 | Mihalcea et al. |
| 2006/0004892 A1 * | 1/2006 | Lunt ................ G06F 17/30864 |
| 2006/0074883 A1 | 4/2006 | Teevan et al. |
| 2006/0123014 A1 | 6/2006 | Ng |
| 2006/0168036 A1 | 7/2006 | Schultz |
| 2006/0294085 A1 | 12/2006 | Rose et al. |
| 2007/0162443 A1 | 7/2007 | Liu et al. |
| 2007/0192306 A1 | 8/2007 | Papakonstantinou et al. |
| 2007/0208751 A1 | 9/2007 | Cowan et al. |
| 2008/0005064 A1 | 1/2008 | Sarukkai |
| 2008/0010337 A1 | 1/2008 | Hayes |
| 2008/0010350 A1 | 1/2008 | Chen et al. |
| 2008/0016053 A1 | 1/2008 | Frieden et al. |
| 2008/0086344 A1 | 4/2008 | Martini et al. |
| 2008/0097968 A1 | 4/2008 | Delgado et al. |
| 2009/0049053 A1 | 2/2009 | Barker et al. |
| 2009/0094233 A1 | 4/2009 | Marvit et al. |
| 2009/0132490 A1 | 5/2009 | Okraglik |
| 2009/0132516 A1 | 5/2009 | Patel et al. |
| 2009/0150866 A1 | 6/2009 | Schmidt |
| 2009/0182727 A1 | 7/2009 | Majko |
| 2009/0313295 A1 | 12/2009 | Blaxland et al. |
| 2010/0063878 A1 | 3/2010 | Bachet et al. |
| 2010/0082695 A1 | 4/2010 | Hardt |
| 2010/0083151 A1 | 4/2010 | Lanza et al. |
| 2010/0169320 A1 | 7/2010 | Patnam et al. |
| 2010/0169326 A1 | 7/2010 | Ma et al. |
| 2010/0179874 A1 | 7/2010 | Higgins et al. |
| 2010/0185610 A1 | 7/2010 | Lunt et al. |
| 2010/0223266 A1 | 9/2010 | Balmin et al. |
| 2010/0268703 A1 | 10/2010 | Buck |
| 2010/0306185 A1 | 12/2010 | Smith |
| 2010/0332330 A1 | 12/2010 | Goel et al. |
| 2011/0004831 A1 | 1/2011 | Steinberg et al. |
| 2011/0040617 A1 | 2/2011 | Moonka et al. |
| 2011/0055241 A1 | 3/2011 | Lewis |
| 2011/0060803 A1 | 3/2011 | Barlin et al. |
| 2011/0087644 A1 | 4/2011 | Frieden et al. |
| 2011/0145719 A1 | 6/2011 | Chen et al. |
| 2011/0214046 A1 | 9/2011 | Haberman et al. |
| 2011/0218946 A1 | 9/2011 | Stern et al. |
| 2011/0231381 A1 | 9/2011 | Mercuri |
| 2011/0271224 A1 | 11/2011 | Cruz Moreno et al. |
| 2012/0030169 A1 | 2/2012 | Allen et al. |
| 2012/0047114 A1 | 2/2012 | Duan et al. |
| 2012/0054303 A1 | 3/2012 | Priyadarshan et al. |
| 2012/0076367 A1 | 3/2012 | Tseng |
| 2012/0078896 A1 | 3/2012 | Nixon et al. |
| 2012/0084291 A1 | 4/2012 | Chung |
| 2012/0124041 A1 | 5/2012 | Bawri et al. |
| 2012/0158720 A1 | 6/2012 | Luan et al. |
| 2012/0158791 A1 | 6/2012 | Kasneci et al. |
| 2012/0209859 A1 | 8/2012 | Blount |
| 2012/0209878 A1 | 8/2012 | Park et al. |
| 2012/0221558 A1 | 8/2012 | Byrne et al. |
| 2012/0221566 A1 | 8/2012 | Iwasa et al. |
| 2012/0239618 A1 | 9/2012 | Kung |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0304215 A1 | 11/2012 | McCarthy et al. |
| 2012/0310922 A1 | 12/2012 | Johnson et al. |
| 2012/0311139 A1 | 12/2012 | Brave et al. |
| 2012/0323998 A1 | 12/2012 | Schoen et al. |
| 2012/0324002 A1 | 12/2012 | Chen |
| 2012/0324027 A1 * | 12/2012 | Vaynblat et al. ............ 709/206 |
| 2012/0330908 A1 | 12/2012 | Stowe et al. |
| 2012/0330992 A1 | 12/2012 | Kanigsberg et al. |
| 2013/0006754 A1 | 1/2013 | Horvitz et al. |
| 2013/0013678 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |

(56) References Cited

U.S. PATENT DOCUMENTS

| | | |
|---|---|---|
| 2013/0054349 A1 | 2/2013 | Ogawa |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080218 A1 | 3/2013 | Reapso |
| 2013/0086057 A1 | 4/2013 | Harrington et al. |
| 2013/0091149 A1 | 4/2013 | Dunn et al. |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110802 A1 | 5/2013 | Shenoy et al. |
| 2013/0110827 A1 | 5/2013 | Nabar et al. |
| 2013/0110978 A1 | 5/2013 | Gordon et al. |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1 | 6/2013 | Graham et al. |
| 2013/0155068 A1 | 6/2013 | Bier et al. |
| 2013/0159096 A1 | 6/2013 | Santhanagopal et al. |
| 2013/0191416 A1 | 7/2013 | Lee et al. |
| 2013/0204706 A1 | 8/2013 | Tang et al. |
| 2013/0212081 A1 | 8/2013 | Shenoy et al. |
| 2013/0218885 A1 | 8/2013 | Satyanarayanan |
| 2013/0218899 A1 | 8/2013 | Raghavan et al. |
| 2013/0227011 A1 | 8/2013 | Sharma et al. |
| 2013/0238449 A1 | 9/2013 | Ferreira et al. |
| 2013/0238587 A1 | 9/2013 | Annau et al. |
| 2013/0238588 A1 | 9/2013 | Annau et al. |
| 2013/0246404 A1 | 9/2013 | Annau et al. |
| 2013/0246405 A1 | 9/2013 | Annau et al. |
| 2013/0246521 A1 | 9/2013 | Schacht et al. |
| 2013/0262588 A1 | 10/2013 | Barak et al. |
| 2013/0268973 A1 | 10/2013 | Archibong et al. |
| 2013/0288715 A1 | 10/2013 | Shieh et al. |
| 2013/0298084 A1 | 11/2013 | Spivack et al. |
| 2013/0326369 A1 | 12/2013 | Buchanon |
| 2013/0332523 A1 | 12/2013 | Luu |
| 2013/0346329 A1 | 12/2013 | Alib-Bulatao et al. |
| 2014/0013353 A1 | 1/2014 | Mathur |
| 2014/0032563 A1 | 1/2014 | Lassen et al. |
| 2014/0040008 A1 | 2/2014 | Belani et al. |
| 2014/0040244 A1 | 2/2014 | Rubinstein et al. |
| 2014/0040246 A1 | 2/2014 | Rubinstein et al. |
| 2014/0040367 A1 | 2/2014 | Lessin et al. |
| 2014/0040370 A1 | 2/2014 | Buhr |
| 2014/0040729 A1 | 2/2014 | Marlow et al. |
| 2014/0041038 A1 | 2/2014 | Lessin et al. |
| 2014/0046982 A1* | 2/2014 | Chan et al. ............... 707/798 |
| 2014/0074602 A1 | 3/2014 | van Elsas et al. |
| 2014/0074888 A1 | 3/2014 | Potter et al. |
| 2014/0074934 A1 | 3/2014 | van Hoff et al. |
| 2014/0114986 A1 | 4/2014 | Biemer et al. |
| 2014/0156652 A1 | 6/2014 | Abiola |
| 2014/0164388 A1 | 6/2014 | Zhang |
| 2014/0173459 A1 | 6/2014 | Gaiser et al. |
| 2014/0181091 A1 | 6/2014 | Lassen et al. |
| 2014/0188899 A1* | 7/2014 | Whitnah ........... G06F 17/30646 707/749 |
| 2014/0189530 A1 | 7/2014 | Anand et al. |
| 2014/0207860 A1 | 7/2014 | Wang et al. |
| 2014/0215351 A1 | 7/2014 | Gansca et al. |
| 2014/0280080 A1 | 9/2014 | Solheim et al. |
| 2014/0282029 A1 | 9/2014 | Vishria |
| 2014/0324850 A1 | 10/2014 | Magnaghi et al. |
| 2014/0330551 A1 | 11/2014 | Bao et al. |
| 2014/0330809 A1 | 11/2014 | Raina et al. |
| 2014/0330818 A1 | 11/2014 | Raina et al. |
| 2014/0330819 A1 | 11/2014 | Raina et al. |
| 2014/0344288 A1 | 11/2014 | Evans et al. |
| 2014/0359023 A1 | 12/2014 | Homsany |
| 2015/0039596 A1 | 2/2015 | Stewart |
| 2015/0058758 A1 | 2/2015 | Tseng |
| 2015/0067505 A1 | 3/2015 | Metcalf et al. |
| 2015/0081449 A1 | 3/2015 | Ge et al. |
| 2015/0100644 A1 | 4/2015 | Gulik |
| 2015/0120700 A1 | 4/2015 | Holm et al. |
| 2015/0127677 A1 | 5/2015 | Wang et al. |
| 2015/0220531 A1 | 8/2015 | Helvik et al. |
| 2015/0242402 A1 | 8/2015 | Holm et al. |
| 2015/0242473 A1 | 8/2015 | Brugard et al. |
| 2015/0248222 A1 | 9/2015 | Stickler et al. |
| 2015/0248410 A1 | 9/2015 | Stickler et al. |
| 2015/0249715 A1 | 9/2015 | Helvik et al. |
| 2015/0294138 A1 | 10/2015 | Barak et al. |
| 2015/0363402 A1 | 12/2015 | Jackson et al. |
| 2015/0363407 A1 | 12/2015 | Huynh et al. |
| 2015/0379586 A1 | 12/2015 | Mooney et al. |
| 2015/0381552 A1 | 12/2015 | Vijay et al. |
| 2016/0034469 A1 | 2/2016 | Livingston et al. |
| 2016/0070764 A1 | 3/2016 | Helvik et al. |
| 2016/0117740 A1 | 4/2016 | Linden et al. |
| 2016/0203510 A1 | 7/2016 | Pregueiro et al. |
| 2017/0072002 A1 | 3/2017 | Bafundo et al. |
| 2017/0091644 A1 | 3/2017 | Chung et al. |

FOREIGN PATENT DOCUMENTS

| | | |
|---|---|---|
| WO | 2008/111087 A2 | 9/2008 |
| WO | 2010/029410 A1 | 3/2010 |
| WO | 2013/026095 A1 | 2/2013 |
| WO | 2013/043654 A2 | 3/2013 |
| WO | 2013/123550 A1 | 8/2013 |
| WO | 2013173232 A1 | 11/2013 |

OTHER PUBLICATIONS

"Connections Enterprise Content Edition", Published on: Nov. 22, 2013 Available at: http://www-03.ibm.com/software/products/en/connections-ecm/.

Hackett, Wes, "Extending the Activity Feed with Enterprise Content", In Proceedings of ActivityFeed, Development, Featured, Sharepoint, Social Features, Jun. 16, 2011, 27 pages.

"Yammer the Enterprise Social Network", Published on: Sep. 9, 2013 Available at: https://about.yammer.com/product/feature-list/.

Guy, et., "Finger on the Pulse: The Value of the Activity Stream in the Enterprise", In Proceedings of 14th IFIP TC 13 International Conference on Human-Computer Interaction, Sep. 2, 2013, 18 pages.

Ronen, et al., "Social Networks and Discovery in the Enterprise (SaND)", In Proceedings of the 32nd International ACM SIGIR Conference on Research and Development in Information Retrieval, Jul. 19, 2009, 1 page.

Muralidharan, et al., "Social Annotations in Web Search", In Proceedings of the ACM Annual Conference on Human Factors in Computing Systems, May 5, 2012, 10 pages.

"Bing Ads targeting—training", Published on: Mar. 31, 2013 Available at: http://advertise.bingads.microsoft.com/en-ca/cl/245/training/bing-ads-targeting.

"Campaign Element Template Parameters—Training", Retrieved on: Oct. 1, 2014 Available at: https://www-304.ibm.com/support/knowledgecenter/SSZLC2_7.0.0/com.ibm.commerce.management-center_customization.doc/concepts/csbcustargdef.htm.

"Enterprise Search from Microsoft", Published on: Jan. 2007, Available at: https://www.google.co.in/url?sa=t&rct=j&q=&esrc=s&source=web&cd=2&cad=rja&ved=0CDMQFjAB&url=http%3A%2F%2Fdownload.microsoft.com%2Fdownload%2Fd%2F0%2F1%2Fd0165e6d-11cb-464b-b24a-c019d82def0d%2FEnterprise%2520Search%2520from%2520Microsoft.doc&ei=IAq9UqueHoTtrAe5yoC4Bg&usg=AFQjCNEax9yYC0KGTUhr4bNIxTJpyyyhsA&bvm=bv.58187178,d.bmk.

"Facets for Enterprise Search Collections", Retrieved on: Jun. 17, 2014, Available at: http://pic.dhe.ibm.com/infocenter/analytic/v3r0m0/index.jsp?topic=%2Fcom.ibm.discovery.es.ad.doc%2Fiiysafacets.htm.

(56) References Cited

OTHER PUBLICATIONS

"Getting Started with your My Site", Published on: Apr. 6, 2013, Available at: http://office.microsoft.com/en-in/sharepoint-server-help/getting-started-with-your-my-site-HA101665444.aspx.

"How to Segment and Target Your Emails—Training", Published on: Aug. 15, 2014 Available at: http://www.marketo.com/_assets/uploads/How-to-Segment-and-Target-Your-Emails.pdf?20130828153321.

"Introducing Delve (codename Oslo) and the Office Graph", Published on: Mar. 11, 2014, Available at: http://blogs.office.com/2014/03/11/introducing-codename-oslo-and-the-office-graph/.

"Introduction to Managed Metadata", Retrieved on: Jun. 23, 2014 Available at: http://office.microsoft.com/en-001/office365-sharepoint-online-enterprise-help/introduction-to-managed-metadata-HA102832521.aspx.

"Persistent Search: Search's Next Big Battleground", Available at: http://billburnham.blogs.com/burnhamsbeat/2006/04/persistent_sear.html, Published on: Apr. 10, 2006, 3 pages.

"Turn search history off or on", retrieved from http://onlinehelp.microsoft.com/en-US/bing/ff808483.aspx, Retrieved date: Dec. 12, 2013, 1 page.

Amitay et al., "Social Search and Discovery using a Unified Approach", In Proceedings of the 20th ACM Conference on Hypertext and Hypermedia, Jun. 29, 2009, pp. 199-208.

Bailly, Nestor, "Finding the Best Video Content Using the Power of the Social Graph", Published on: Jul. 17, 2013 Available at: http://iq.intel.com/iq/35820000/finding-the-best-video-content-using-the-power-of-the-social-graph.

Bobadilla et al., "Recommender Systems Survey", In Journal of Knowledge-Based Systems, vol. 46, Jul. 2013, pp. 109-132.

Daly et al., "Social Lens: Personalization around user Defined Collections for Filtering Enterprise Message Streams", In Proceedings of the Fifth International AAAI Conference on Weblogs and Social Media, Published on: Jul. 17, 2011, 8 pages.

Diaz et al., "SIGIR 2013 Workshop on Time Aware Information Access (#TAIA2013)", In Proceedings of the 36th International ACM SIGIR Conference on Research and Development in Information Retrieval, Aug. 1, 2013, 41 pages.

Elbassuoni et al., "Language-Model-Based Ranking for Queries on RDF-Graphs", In Proceedings of the 18th ACM Conference on Information and Knowledge Management, Nov. 2, 2009, 10 pages.

Fan et al., "Tuning Before Feedback: Combining Ranking Discovery and Blind Feedback for Robust Retrieval", Retrieved at http://filebox.vt.edu/users/wfan/paper/ARRANGER/p52-Fan.pdf, 27th Annual International ACM SIGIR Conference on Research and Development in Information Retrieval, Jul. 25, 2004, 8 pages.

Fazio, Stephanie, "How Social is Enterprise Search?", Published on: Mar. 14, 2012, Available at: http://blogs.opentext.com/vca/blog/1.11.647/article/1.26.2007/2012/3/14/How_Social_is_Enterprise_Search%3F.

Fox, Vanessa, "Marketing in the Age of Google", John Wiley & Sons, Mar. 8, 2012, 3 pages.

Giugno et al., "GraphGrep: A Fast and Universal Method for Querying Graphs", In Proceedings of the 16th International Conference on Pattern Recognition, vol. 2, Aug. 11, 2002, 4 pages.

Gruhl et al., "The Web beyond Popularity—A Really Simple System for Web Scale RSS", In Proceedings of the 15th International Conference on World Wide Web, May 23, 2006, pp. 183-192.

Guy et al., "Personalized Recommendation of Social Software Items Based on Social Relations", In Proceedings of the Third ACM Conference on Recommender Systems, Oct. 2009, pp. 53-60.

Hanada, Tetsuya, "Yammer—Enterprise Graph SharePoint", In Australian Sharepoint Conference, Jun. 11, 2013, 23 pages.

International Search Report & Written Opinion Issued in PCT Patent Application No. PCT/US2015/017877, dated May 29, 2015, 12 Pages.

Josh, "Send Notifications to your Customers in their Timezone—training", Published on: Aug. 19, 2014 Available at: https://mixpanel.com/blog/2014/08/19/announcement-send-notifications-in-your-customer-s-timezone.

Kelly et al., "The Effects of Topic Familiarity on Information Search Behavior", Retrieved at http://www.ils.unc.edu/~dianek/kelly-jcd102.pdf, Joint Conference on Digital Libraries, Portland, Oregon, USA, Jul. 13, 2002, 2 pages.

Khodaei et al., "Social-Textual Search and Ranking", In Proceedings of the First International Workshop on Crowdsourcing Web Search, Apr. 17, 2012, 6 pages.

Kubica et al., "cGraph: A Fast Graph-Based Method for Link Analysis and Queries", In Proceedings of the IJCAI Text-Mining & Link-Analysis Workshop, Aug. 2003, 10 pages.

Li et al., "Personalized Feed Recommendation Service for Social Networks", In IEEE 2nd International Conference on Social Computing, Aug. 20, 2010, 8 pages.

Li et al., "Research of Information Recommendation System Based on Reading Behavior", In International Conference on Machine Learning and Cybernetics, vol. 3, Jul. 12, 2008, 6 pages.

Liang et al., "Highlighting in Information Visualization: A Survey", In Proceedings of 14th International Conference Information Visualisation, Jul. 26, 2010, pp. 79-85.

Masuch, Lukas, "Hack: Enterprise Knowledge Graph—One Graph to Connect them All", Published on: Mar. 28, 2014, Available at : http://www.managementexchange.com/hack/enterprise-knowledge-graph-one-graph-connect-them-all.

Pecovnik, Simon, "Enterprise Graph Search—take 1", Published on: Jan. 28, 2014, Available at: http://www.ravn.co.uk/2014/01/28/enterprise-graph-search/.

Perer et al., "Visual Social Network Analytics for Relationship Discovery in the Enterprise", In IEEE Conference on Visual Analytics Science and Technology, Published on: Oct. 23, 2011, 9 pages.

Roth et al., "Suggesting Friends Using the Implicit Social Graph", In Proceedings of the 16th ACM SIGKDD International Conference on Knowledge Discovery and Data Mining, Jul. 25, 2010, 9 pages.

Ubbesen, Christian, "Enterprise Graph Search", Published on: Jan. 28, 2013, Available at: http://www.findwise.com/blog/enterprise-graph-search/.

Yap, Jamie, "Graph Search Capabilities Offer Enterprise Benefits", Published on: Feb. 14, 2013, Available at: http://www.zdnet.com/graph-search-capabilities-offer-enterprise-benefits-7000011304/.

Yeung, Ken, "Yammer Unveils the Open Graph for the Enterprise, to Help make Business Apps More Social", Published on: Oct. 29, 2012, Available at: http://thenextweb.com/insider/2012/10/29/yammer-using-the-enterprise-graph/?utm_source=feedburner&utm_medium=feed&utm_campaign=Feed:+TheNextWeb+(The+Next+Web+All+Stories).

Zhibao et al., "EISI: An Extensible Security Enterprise Search System", In 2nd International Conference on Computer Science and Network Technology, Dec. 29, 2012, pp. 896-900.

PCT International Preliminary Report on Patentability Issued in Application No. PCT/US2015/017877, dated May 23, 2016, 16 Pages.

"Second Written Opinion Issued in PCT Application No. PCT/US2015/017877", dated Jan. 13, 2016, 7 Pages.

European Office Action in Application 15710653.5, dated Jul. 27, 2017, 8 pages.

U.S. Appl. No. 14/188,079, Notice of Allowance dated Sep. 7, 2017, 7 pages.

PCT International Preliminary Report on Patentability Issued in Application No. PCT/US2016/012399, dated Jul. 11, 2017, 9 Pages.

Resnick, "Request for Comments: 5322", Network Working Group, Qualcomm Incorporated, 57 pages (Oct. 2008).

"8 Things Marketers Ought to Know About Facebooks New Trending Feature", Retrieved from: https://web.archive.org/save/https://www.facebook.com/notes/brandlogist/8-things-marketers-ought-to-know-about-facebooks-new-trending-feature/650859898308191/, Jan. 30, 2014, 5 Pages.

"Trending—Definition and Synonyms", Retrieved from: https://web.archive.org/web/20170618063522/http://www.macmillandictionary.com:80/us/dictionary/american/trending, Jul. 18, 2014, 1 Page.

Dayal, Priyanka, "How Many Tweets Make a Trend?", Retrieved from: https://www.vuelio.com/uk/blog/how-many-tweets-make-a-trend/, Aug. 28, 2013, 5 Pages.

* cited by examiner

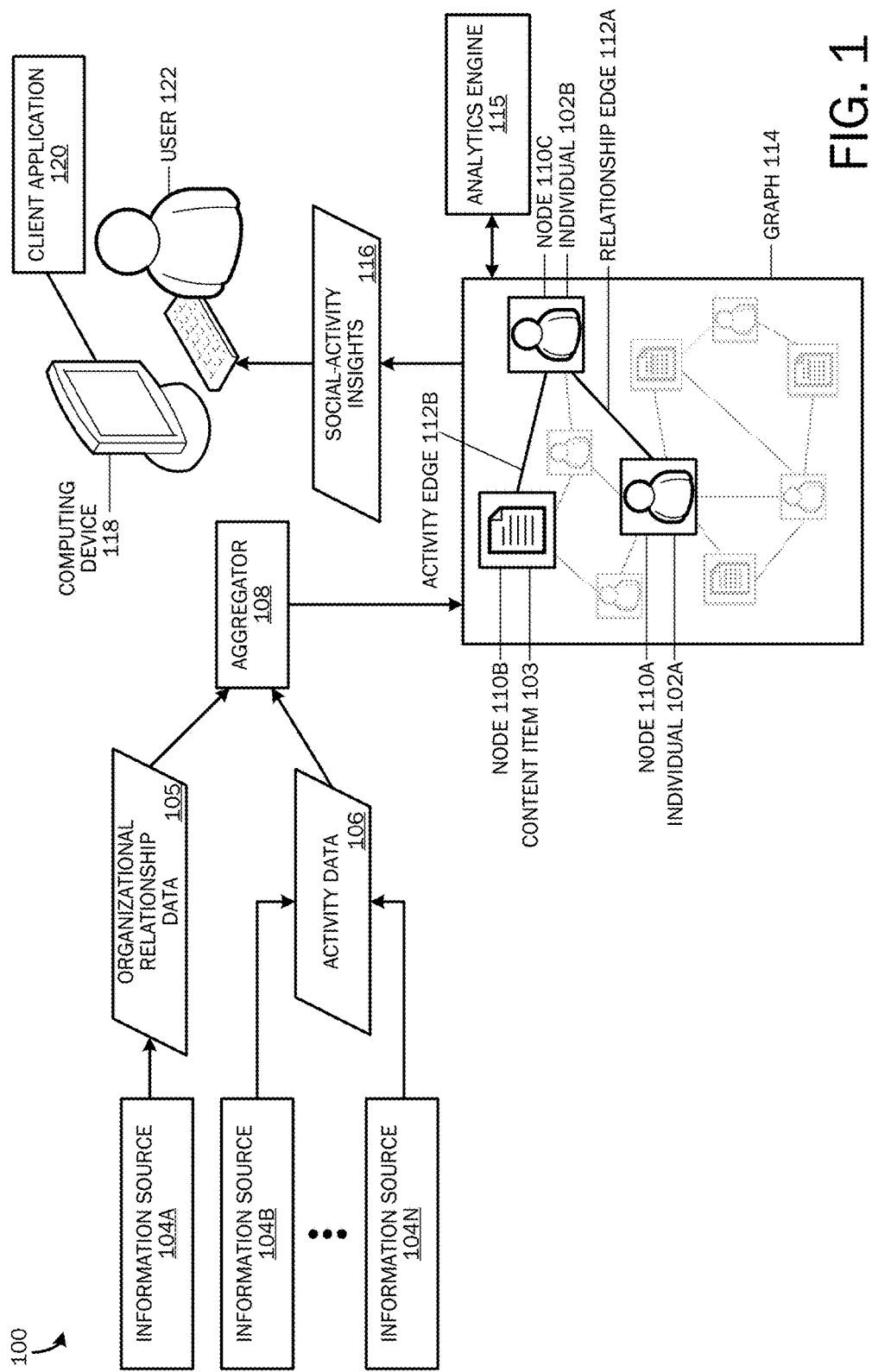

FIG. 2A

- SOCIAL ACTIVITY INSIGHTS UI 202
- VISUALIZATION OF CONTENT ITEM 204
- TITLE OF CONTENT ITEM 206: Patent Application Drawings
- SUMMARY OF CONTENT ITEM 208: *A patent is a proprietary right granted by the Federal government to an inventor who files a patent application with the United States Patent Office.*
- PROPERTIES 210: Liz Andrews, Created 30 June 2023, 18, 6, ☆ 1, 1
- HIGHLIGHTED INFORMATION 212: John Washington, George Adams and 14 others viewed
- TAGS 214: NEW, VIEWED A LOT BY YOUR TEAM, JOHN DOE SHARED

FIG. 2C

MOBILE COMPUTING DEVICE

DISPLAYING AND POSTING AGGREGATED SOCIAL ACTIVITY ON A PIECE OF ENTERPRISE CONTENT

BACKGROUND

In an enterprise, various pieces of content may be scattered around the enterprise. For example, documents may be stored in various repositories, may be shared between individuals, and may be interacted with by various individuals via a variety of workloads. Some content items may be interesting to or relevant to a particular user; however, he/she may not be aware of why the content may be interesting to him/her or that he/she may have a personal connection to it.

A content item may have been viewed, edited, commented on, etc. by people with whom the user has a relationship. A traditional document browsing or search experience may provide regular metadata such as a content item's title, location, file size, summary, etc., but may not provide insights as to why the content item may matter to him/her. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing a personalized view of insights into social activity surrounding a content item that may indicate to a user why a given piece of content may be interesting to him/her. A user's activities, as well as the activities of others (e.g., colleagues of the user) may be shown, including such items as a total number of views, comments, followers, and likes associated with the content item. The insights view may be personalized based on the user's relationships with other users in association with the content item. The user's relationships with others in association with the content item may be represented in an enterprise graph. Thus, the user may learn through the personalized view who among his/her relationships have commented, edited, shared, followed, or liked the content item, as well as, how many of the user's colleagues have viewed the content item. In addition, through a search function that may be applied to the personalized view, a user may learn about related content items based on the social insights. For example, a user may find all content that is trending among his/her colleagues by selecting a tag associated with a given content item that causes a search for related content items.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings:

FIG. 1 is a block diagram of one embodiment of a system for providing a personalized view of insights into social activity surrounding a content item;

FIG. 2A is an illustration of an example insights UI comprising a personalized view of social activity insights surrounding a content item;

FIG. 2C is an illustration of a collection of documents displayed in a UI and comprising a personalized view of social activity insights surrounding each document;

DETAILED DESCRIPTION

Figure 2B:
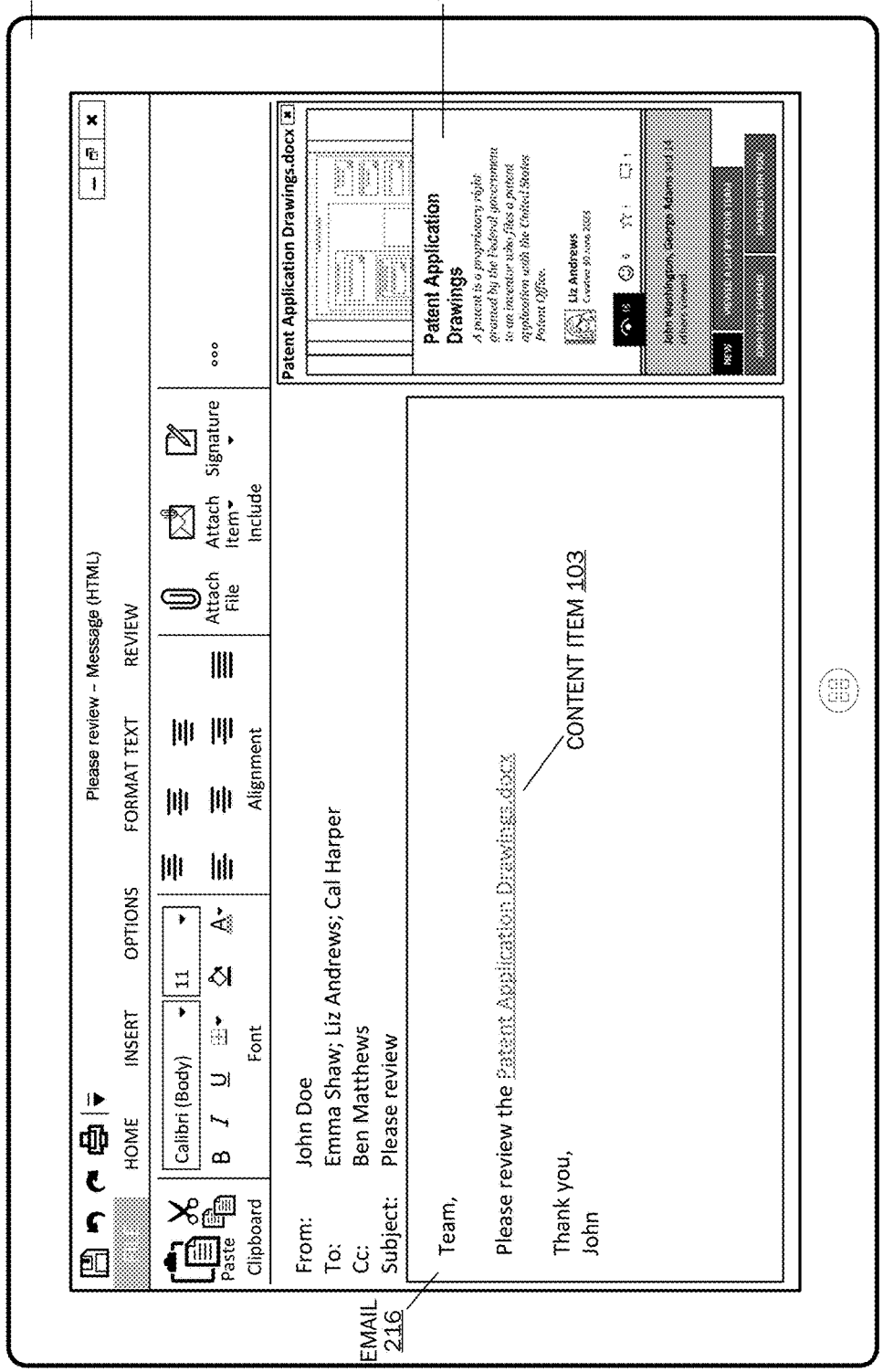
FIG. 2B is an illustration of an example email comprising an linked document and a personalized view of social activity insights surrounding the document displayed in an insights UI.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to a personalized view of insights into social activity surrounding a content item that may indicate to a user why a given piece of content may be interesting to the user. A user's activities, as well as the activities of others (e.g., colleagues of the user) may be shown, including such items as a total number of views, comments, followers, and likes associated with the content item. The insights view may be personalized based on the user's relationships with other users in association with the content item. Through a search function that may be applied to the personalized view, a user may learn about related content items based on the social insights. The insights view may be displayed in a user interface, and a user may take action on content items in the displayed view without context switch.

Referring now to the drawings, in which like numerals represent like elements, various embodiments will be described. FIG. 1 is a block diagram illustrating a system architecture 100 for providing a personalized view of insights into social activity surrounding a content item. The system architecture 100 includes an aggregator 108 operable to collect organizational relationship data 105 for individuals and activity data 106 associated with individuals 102A-B (collectively 102) and content items 103 from a plurality of information sources 104A-N (collectively 104) and store the relationship data 105 and activity data 106 in a graph 114. The information sources 104 may include various types of workloads or information sources such as social networking services, enterprise social network services, online productivity software suites (which may include applications such as, but not limited to, a word processing application, a spreadsheet application, a slide presentation application, a notes taking application, a calendaring application, a video conferencing and instant messaging application, etc.), collaboration services, communication software, etc.

Activity data 106 may comprise various types of information such as, but not limited to, presence data, interaction data, data associated with communication with another person (e.g., emailing, messaging, conferencing, etc.), data associated with an individual's activity stream (e.g., authoring or modifying a document, liking, commenting, following, or sharing a document, following a person, commenting on a feed, etc.), trending data, group membership (e.g., inclusion in a distribution list, attendee in a meeting invitation, etc.). Organizational relationship data 105 may comprise various types of information such as, but not limited to, data associated with a project structure or organizational structure (e.g., who an individual works with, works for, is a peer to, directs, manages, is managed by, etc.).

As mentioned above, the organizational relationship data 105 and activity data 106 may be stored in a graph 114. Activities and people relationships may be stored as edges 112A-B (collectively 112), and individuals 102 interacted with and content items 103 that are acted upon may be stored as nodes 110A-C (collectively 110). For example, a node 110 may include an individual 102 (nodes 110A and 110C), a group of individuals, a content item 103 such as a document (node 110B), an email or other communication type, a webpage, etc.

An edge 112 may include various types of actions (i.e., activity edge 112B) (e.g., like, comment, follow, share, authoring, modifying, communication, participation, etc.) and relationships (i.e., relationship edge 112A). Consider for example that an individual 102 "likes" a certain document (i.e., selects a "like" option associated with the document). The individual and the document (content item 103) may be stored as nodes 110 and the "like" selection may be stored as an edge 112.

A relationship edge 112A may include explicit relationships and/or implicit relationships. Explicit relationships may include relationships defined according to an organization structure and data (i.e., organizational relationship data 105). For example, an explicit relationship may include an individual's manager, peers, directs, etc. An explicit relationship may be stored as a relationship edge 112A such as a manager edge, peer edge, directs edge, etc. Implicit relationships may include relationships determined according to activity in one or more workloads (i.e., activity data 106 from one or more information sources 104). For example, an implicit relationship may include an individual 102 following another individual on an enterprise social network service (information source 104), being included on a distribution list with another individual, is a co-author of a document with another individual, emailing (or other type of communication) with another individual, group memberships, commenting on another individual's feed, etc. According to an embodiment, an implicit relationship may be stored as a relationship edge 112A in the graph 114.

The system 100 may comprise an analytics engine 115 operable to calculate and apply weights on edges 112 according to what activity is performed (e.g., a like, comment, share, follow, email, etc.) and the relationship between a first individual 102 and the individual(s) 102 performing the activity. Weights may also be based on how recently an activity was performed. A weight on a relationship edge 112A may be based on implicit or explicit signals generated through activity on the plurality of workloads, such as an amount and type of activity an individual 102 has with another person, a number of times an individual 102 interacts with a content item 103, the type of interaction, etc. For example, if an individual 102 communicates via email with a first information worker (IW) daily, and is frequently an attendee of meetings that the first IW is also an attendee of, the weight of a relationship edge 112A between the individual 102 and the first IW may be higher than the weight of a relationship edge 112A between the individual 102 and a second IW whom the individual 102 emails less frequently and who share a common "like" of a document on a social network site. A weight on an activity edge 112B may also be based on a type of activity. For example, an "edit" or "share" operation may be considered to be more important than a "like" operation, and thus may have a higher weighting than the "like" operation. An individual's relationship edges 112A and activity edges 112B may be ranked according to their calculated weights.

Content items 103 may be presented to a user 122, wherein the user 122 may be an individual 102 represented by a node 110 in the graph 114. One or more content items 103 may be presented to the user 122 in a variety of contexts. For example, a content item 103 may be shared with or referenced in an email to the user 122, the user 122 may browse a collection of content items 103 stored in a folder, document library, or other repository, etc. When a content item 103 is presented to a user 122, a personalized view of social activity insights 116 surrounding the content item 103 may also be presented. Embodiments may provide for gathering global activity for a content item 103 and for determining what activities to highlight to a given user 122 according to the activity and according to which individual (s) 102 interacted with the content item 103 and his/her/their relationship with the user 122.

The personalized view of social activity insights 116 may highlight activity associated with individuals 102 with whom the user 122 has a connection, and may indicate to the user 122 why the particular content item 103 may be of interest or relevant to him/her. The highlighted activity may include such information as a total number of views, comments, followers, and likes. The insights may be personalized based on the user's 122 relationships edges 112A in the graph 114. A determination may be made as to which individuals 102 may be of significance to the user 122, and the interactions (e.g., views, comments, edits, likes, etc.) those individuals 102 have had with the content item 103 may be displayed, According to embodiments, selectable tags may be automatically provided with the content item 103. The tags may help a user 122 to better conceptualize the content item 103 that is presented, and may also provide a means to retrieve similar content items 103 as will be described in further detail with reference to FIGS. 2C and 2D.

Content items 103 and a personalized view of social activity insights 116 surrounding the content items 103 may be presented to a user 122 via a client application 120 on a computing device 118. The computing device 118 may be one of a variety of suitable computing devices described below with reference to FIGS. 4 through 6. For example, the computing device 118 may include a tablet computing device, a desktop computer, a mobile communication device, a laptop computer, a laptop/tablet hybrid computing device, a gaming device, or other type of computing device for executing applications 120 for performing a variety of tasks.

The application 120 illustrated in association with computing device 118 is illustrative of any application having sufficient computer executable instructions for enabling embodiments of the present invention as described herein. The application 120 may include a thick client application, which may be stored locally on the computing device 118, or may include a thin client application (i.e., web application) that may reside on a remote server and accessible over a network, such as the Internet or an intranet. A thin client application may be hosted in a browser-controlled environment or coded in a browser-supported language and reliant on a common web browser to render the application executable on a computing device 118.

When an indication of a request to display a content item 103 and social activity insights 116 surrounding the content item 103 is received, the graph 114 may be queried for the particular content item's node 1106, and a request may be made for all activity edges 112B associated with the content item's node 1106 and the nodes 110 to which the activity edges 112B connect (i.e., individuals 102 who have acted on the content item 103). According to an embodiment, a request may also be made for the node 110 associated with the user 122 to whom the content item 103 and social activity insights 116 surrounding the content item 103 will be displayed. Additionally, a query may be made for the user's 122 relationship edges 112A and the nodes 110 to which the relationship edges 112A connect (i.e., individuals who are connected to the user 122 via the relationship edges 112A). An intersection or overlap between the activity edges 112B connected to the content item 103 and the user's 122 relationship edges 112A may be highlighted to the user 122.

Referring now to FIG. 2A, an example social activity insights user interface (herein referred to as an insights UI) 202 is illustrated that may be displayed on any suitable computing device 118 described above. The insights UI 202 may comprise information about a content item 103 that has been personalized for a specific user 122, as well as non-personalized information about the content item 103 for which social activity insights are being provided. Non-personalized information that may be provided may include such information as a visualization 204 of the content item 103. According to an embodiment, the visualization 204 may be a preview of a page of the content item 103, for example, displayed as a thumbnail image. According to another embodiment, the visualization 204 may be the actual content item 103 displayed in a condensed workspace pane of an appropriate application. For example, if the content item 103 is a word processing document, the visualization 204 may be an instantiation of the word processing document (content item 103) displayed in a small word processing application pane. Additionally, a title 206 and a summary 208 of the content item 103 may be displayed. The visualization 204, title 206, and/or the summary 208 may be selectable such that when selected, an instantiation of the content item 103 may be provided in an appropriate application workspace.

Additional non-personalized information may be provided including properties 210 such as information about who authored the content item 103, a number of views, likes, followers, comments, etc. Each of the properties 210 may be selectable. When selected, additional information may be provided such as specific individuals 102 who viewed, liked, followed, or commented on the content item 103. Selection on an individual 102, for example, the individual 102 who authored the content item 103, may provide additional information about the individual, or may provide connectivity to communication with the selected individual 102. Additionally, embodiments may provide for enabling the user 122 to contribute to activity, for example, to like, follow, share, or comment on the content item 103. According to an embodiment, connectivity may be provided within the insights UI 202 without switching context.

As described above, personalized social activity insights, such as highlighted information 212 may be displayed in the insights UI 202 as illustrated in FIG. 2A, providing a personalized view into global social activity associated with the content item 103. The highlighted information 212 may be one or more insights associated with the content item 103 determined to be of importance to the user 122. The determination may be made according to weights/rankings as described above with reference to the analytics engine 115. Social activity associated with the content item 103 may be persisted as activity edges 112A in a graph 114, and may be ranked according to how close of a relationship the user 122 has with the individual 102 performing the activity, the type of activity performed, how recently the activity was performed, etc. For example, if a document is modified by a colleague, liked by a colleague, viewed by a colleague, or commented on by a colleague, a score or weight may be calculated for each activity based on the particular colleague and his/her relationship with the user 122. One or more of the top ranked activities may be provided as an insight and provided as highlighted information 212 in an insights UI 202. The highlighted information 212 may be expanded to show additional insights.

According to embodiments, search queries may be surfaced as one or more tags 214 on the content item 103. According to an embodiment, a tag 214 may be generated by a user 122 to affinitize a content item 103 with a topic (e.g., John tags a document with "Ergonomics") or for personal utility (e.g., John tags a document to "read this later"). According to another embodiment, tags 214 may be automatically suggested to a given user 122, and may provide personalized information that may be useful to the user 122. For example, tags 214 may provide information such as if a content item 103 has been presented to the user 122, shared with the user 122 (e.g., via email, via a file hosting service, etc.), trending around the user 122, trending around other individuals 102, worked on by the user 122, viewed by the user 122, followed by the user 122, contributed to by the user 122, modified by the user 122, viewed by, worked on, commented on, followed by, or modified by an individual 102 with whom the user 122 has an implicit or explicit relationship, etc. The one or more tags 214 may be selectable. Selection of a tag 214 may initiate a search query for additional content items 103 matching the selected tag 214. For example, if a user 122 selects a "trending around me" tag 214, a search query may be performed for other content items 103 may be trending around the user 122. The results may be displayed in a user interface. According to one embodiment, all search results may be presented. According to another embodiment, a top n results may be displayed, wherein the top n results may be content items 103 with the highest ranking edges 112 as determined according to such factors as the type of activity performed (e.g., viewing, following, commenting on, liking, etc.), how close of a relationship the user 122 has with individual(s) 102 performing the activity, how recently the activity was performed, etc. The n may be a predetermined number or a selectable number.

As described above, one or more content items 103 may be presented to a user 122 in a variety of contexts such as a document being linked or referenced in an email to the user 122. FIG. 2B is an illustration of an example email 216 displayed on a display surface of a computing device 118. The example email 216 comprises attached link to a document (content item 103) and a personalized view of social activity insights 116 surrounding the content item 103 provided in an insights UI 202 and displayed in the email 216.

Figure 2C:
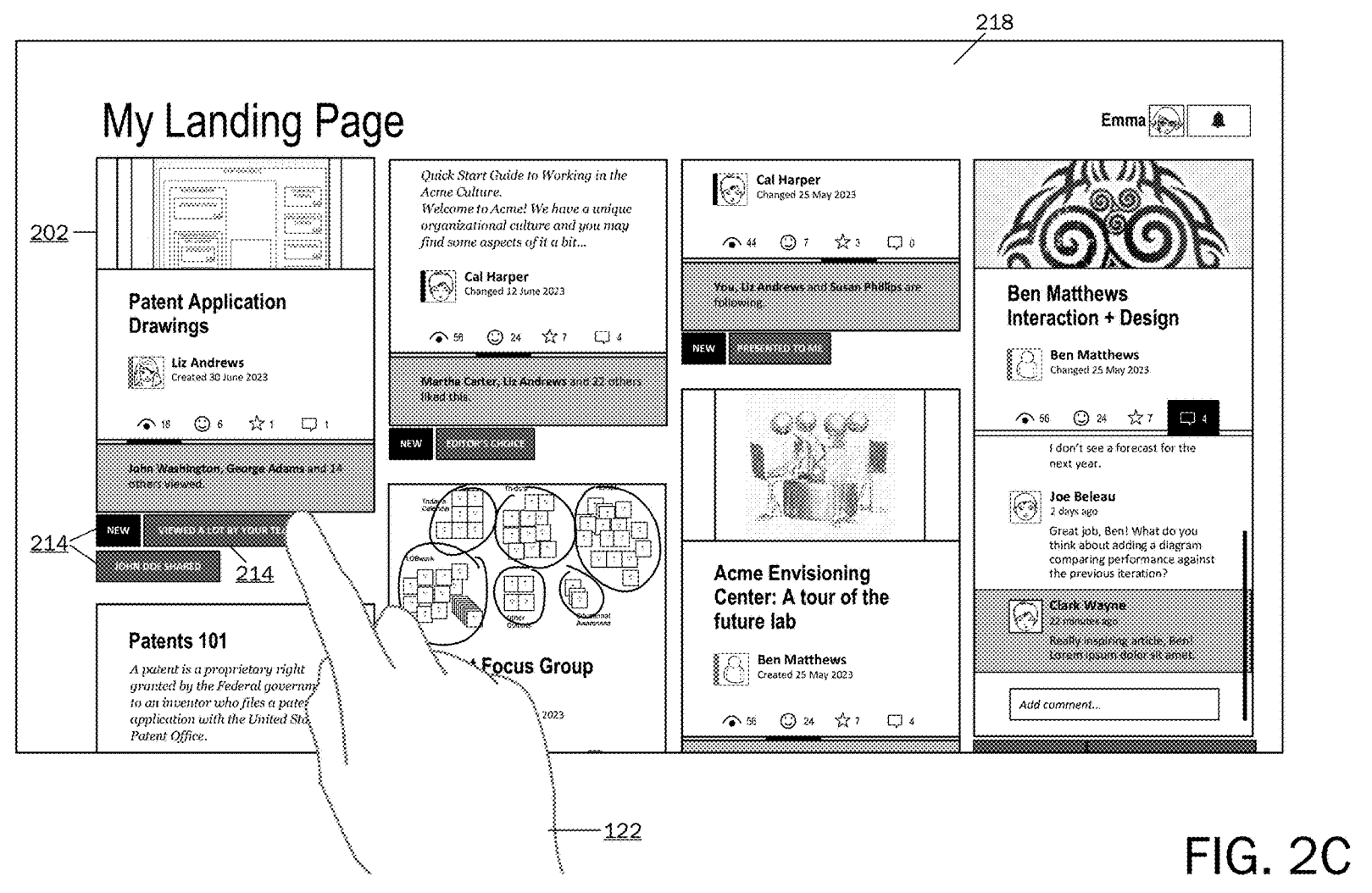

Also as described above, a listing or compilation of content items 103 may be presented to a user 122 when browsing a collection of content items 103 stored in a folder, document library, or other repository, etc. FIG. 2C is an illustration of an aggregation of content items 103 surfaced as a plurality of insights UIs 202 and displayed on a landing page UI 218. Each insights UI 202 may include a personalized view of social activity insights 116 surrounding the content item 103 with which it is associated, and may include one or more selectable tags 214 as illustrated. FIG. 2C shows a tag 214 being selected by a user 122 to launch a search query for other content items 103 determined to be viewed a lot by the user's team according to social signals and relationships persisted as edges 112 in a graph 114.

Figure 2D:
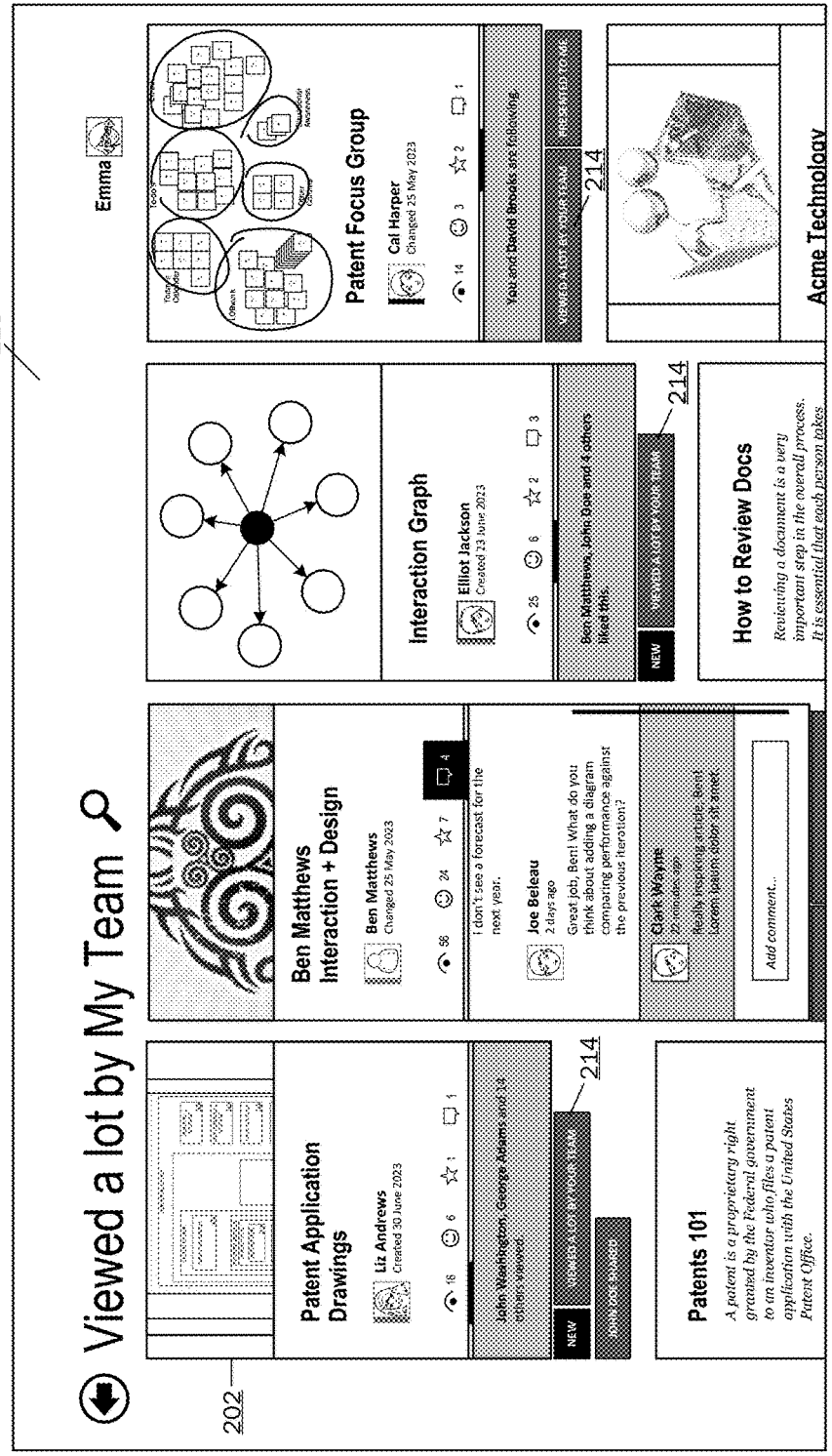
FIG. 2D is an illustration of a collection of documents displayed in a UI as a result of a search query for documents viewed by a user's team.

FIG. 2D is an illustration of results of the search query initiated in FIG. 2C via a selection of the "viewed a lot by your team" tag 214. As illustrated, a collection of documents (content items 103) which fit a parameter of being viewed a lot by the user's 122 team are displayed in the landing page UI 218. Accordingly, the user 122 is enabled to search for related content in a simplified and intuitive manner.

Figure 3:
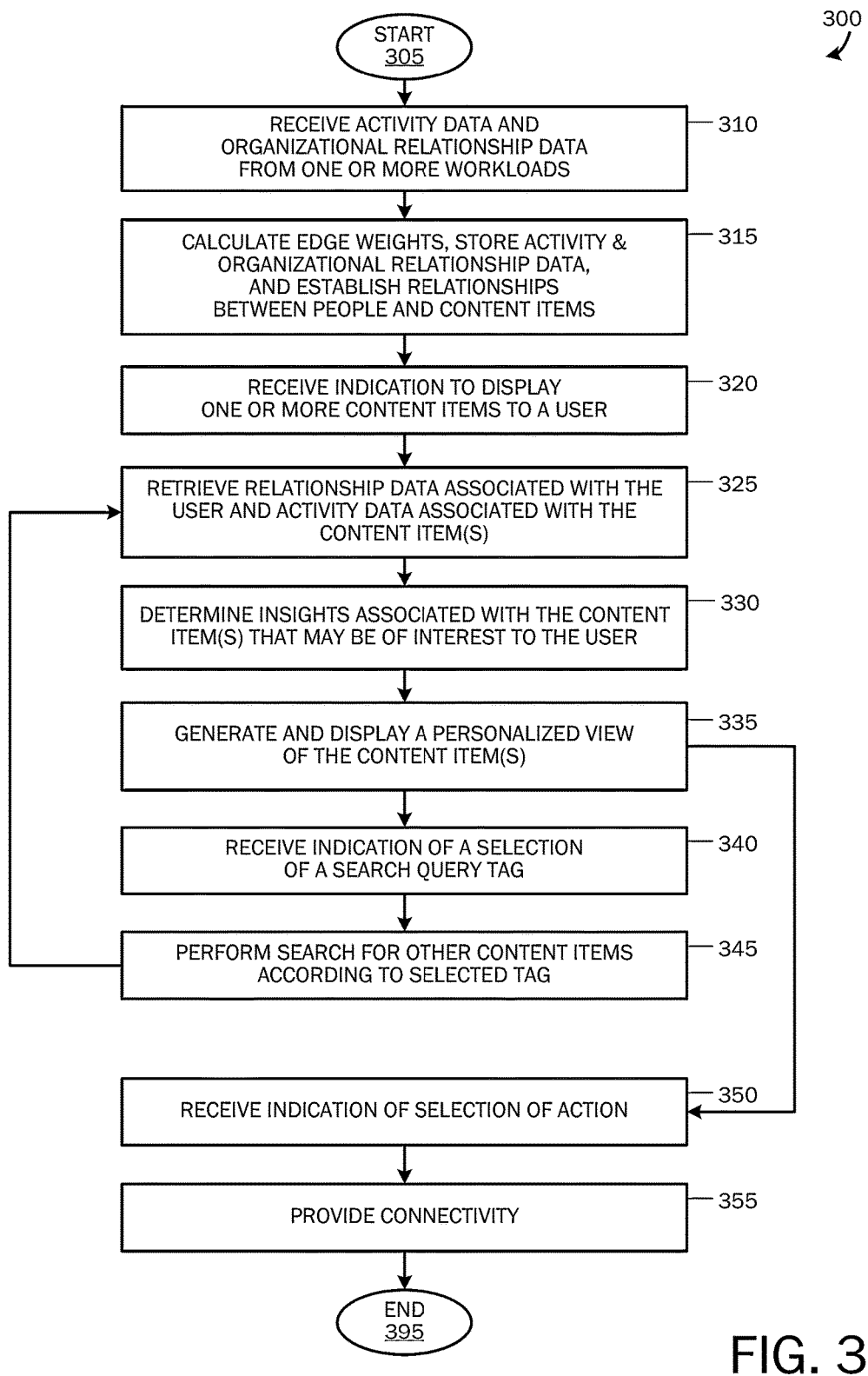
FIG. 3 is a flow chart of a method for providing a personalized view of insights into social activity surrounding a content item.

FIG. 3 is a flow chart showing one embodiment of a method 300 for providing a personalized view of social activity insights 116 of a content item 103. The method 300 starts at OPERATION 305 and proceeds to OPERATION 310, where activity data 106 and organizational relationship data 105 for one or more individuals 102 may be retrieved from one or more of a plurality of workloads or information sources 104. As described above, activity data 106 may comprise various types of information such as, but not limited to, presence data, data associated with authoring or modification of a document, trending data, feedback data (e.g., like, comment, follow, share, etc.), data associated with whom an individual 102 interacts and communicates, etc. Organizational relationship data 105 may comprise data associated with organizational structure (e.g., who an individual works with, works for, is a peer to, directs, manages, is managed by, etc.). The one or more workloads or information sources 104 may include information sources such as social networking services, enterprise social network services, online productivity software suites, collaboration services, communication software, etc. According to an embodiment, OPERATION 305 may include a set-up process where each individual 102 may indicate which information sources 104 he/she uses from which activity data 106 and organizational relationship data 105 may be received. Each individual 102 may be required to enter authentication information for the various information sources 104.

The method 300 may proceed to OPERATION 315, where weights may be calculated based on implicit and explicit signals generated through activity on the plurality of workloads, and the relationship data 105 and activity data 106 may be stored in a graph 114 with their calculated weights as edges 112. That is, relationship data 105 and the activity data 106 may be analyzed, weights may be calculated according to explicit relationships and amount, type, and recency of activities/interactions with other people, and relationships may be established between each individual 102 and the people with whom the individual has interacted and people with whom the individual is associated according to an organization or project structure. Additionally, relationships may be established between the individual 102 and content items 103 (e.g., documents, emails, webpages, etc.) upon which an activity was performed by the individual 102 or by other people with whom the individual 102 is associated implicitly and/or explicitly.

The method 300 may proceed to OPERATION 320, where an indication to display one or more content items 103 to a user 122 is received, wherein the user 122 is an individual 102 represented in the graph 114. For example, one or more content items 103 may be shared with the user 122, the user 122 may select to view a listing or collection of content items 103 stored in one or more folders, document libraries, or other repositories, etc.

At OPERATION 325, the graph 114 may be queried for activity edges 112B and relationship edges 112A associated with the user 122 and for activity data associated with the one or more content items 103 persisted as edges 112 in the graph 114.

At OPERATION 330, a determination may be made as to which social activity insights 116 associated with the one or more content items 103 to display to the specific user 122. As described above, activity edges 112 connected to the one or more content items' nodes 110 may be weighted and ranked according to the user's relationships in the graph 114. The determination may be made as to which social activity insights 116 have the highest rankings.

The method 300 may proceed to OPERATION 335, where a personalized view of the one or more content items 103 and including the determined social activity insights 116 associated with the one or more content items 103 may be generated and displayed in one or more insights UIs 202. As described above, the insights UI 202 may comprise a visualization 204 of the content item 103, other data such as the title 206 of the content item 103, a summary 208 of the content item 103, various properties 210 such as the author of the content item 103 and global activity (e.g., views, comments, likes, favorites, follows, etc.), and social activity insights 116 personalized to the user 122 displayed as highlighted information 212 and search query tags 214.

The method 300 may proceed to either OPERATION 340 or 350. At OPERATION 340, an indication of a selection of a tag 214 may be received, as illustrated in FIG. 2C. At OPERATION 345, a query may be performed for other content items 103 matching the parameters of the selected tag 214. The method 300 may then return to OPERATION 325 to retrieve edges 112 connected to the user 102 and edges 112 connected to the content items 103 matching the parameters of the selected tag 214.

At OPERATION 350, an indication of a selection to perform an action may be received. For example, the user 102 may select to contribute to activity associated with the content item 103 (e.g., share, follow, like, view, or modify the content item 103, provide a comment, etc.). At OPERATION 355, connectivity may be provided enabling the user 122 to act on the content item 103. According to one embodiment, connectivity may be provided without switching context. For example, the user 122 may be able to view, like, follow, or share the content item 103 within the insights UI 202. According to another embodiment, connectivity may be provided by opening an appropriate application for a selected functionality. For example, if the user 122 selects to view the content item 103, the content item 103 may be opened in an appropriate application for the selected document (e.g., an instance of a spreadsheet document may be opened in spreadsheet application). The method may end at OPERATION 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
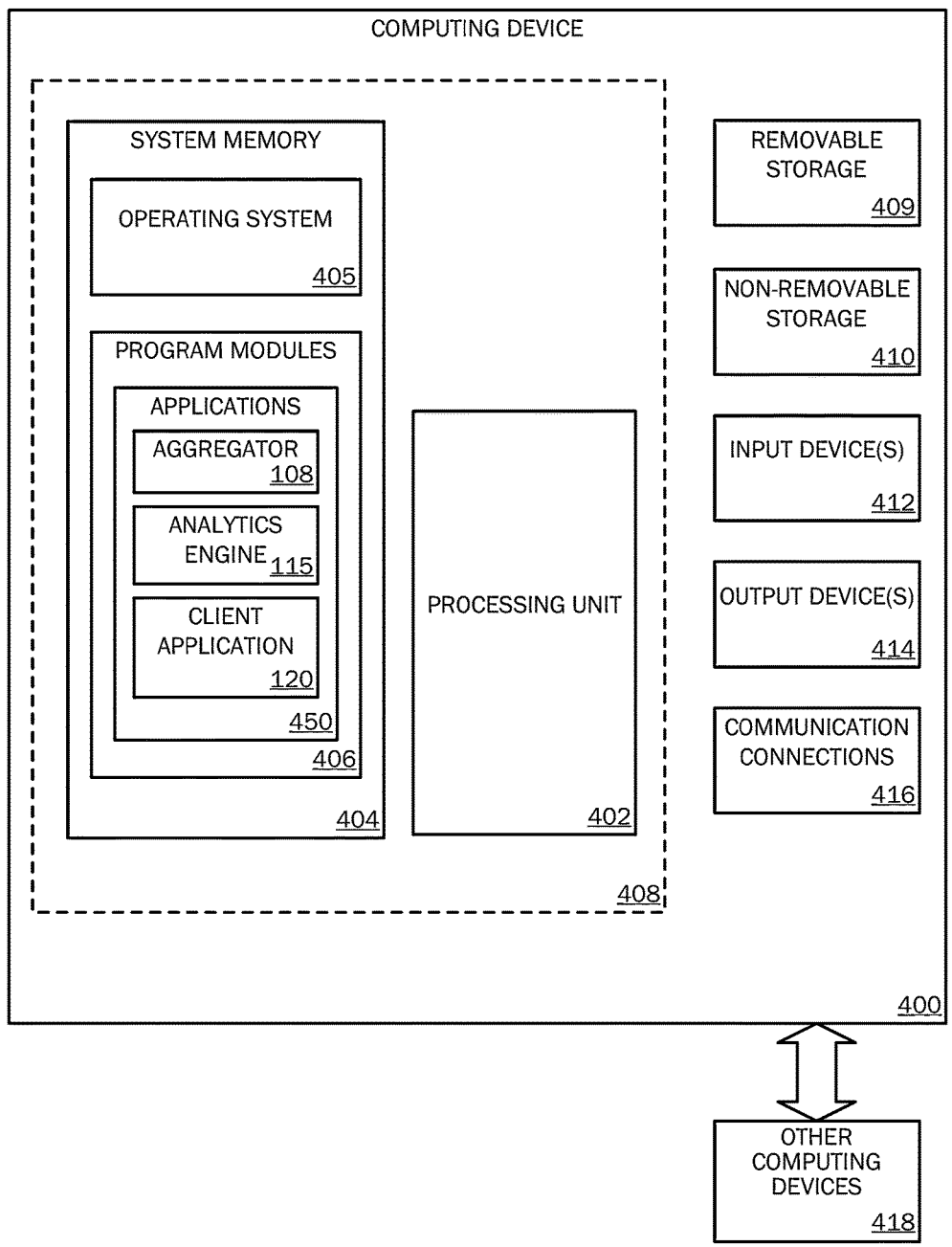
FIG. 4 is a block diagram illustrating example physical components of a computing device with which embodiments of the invention may be practiced.
Figure 5A:
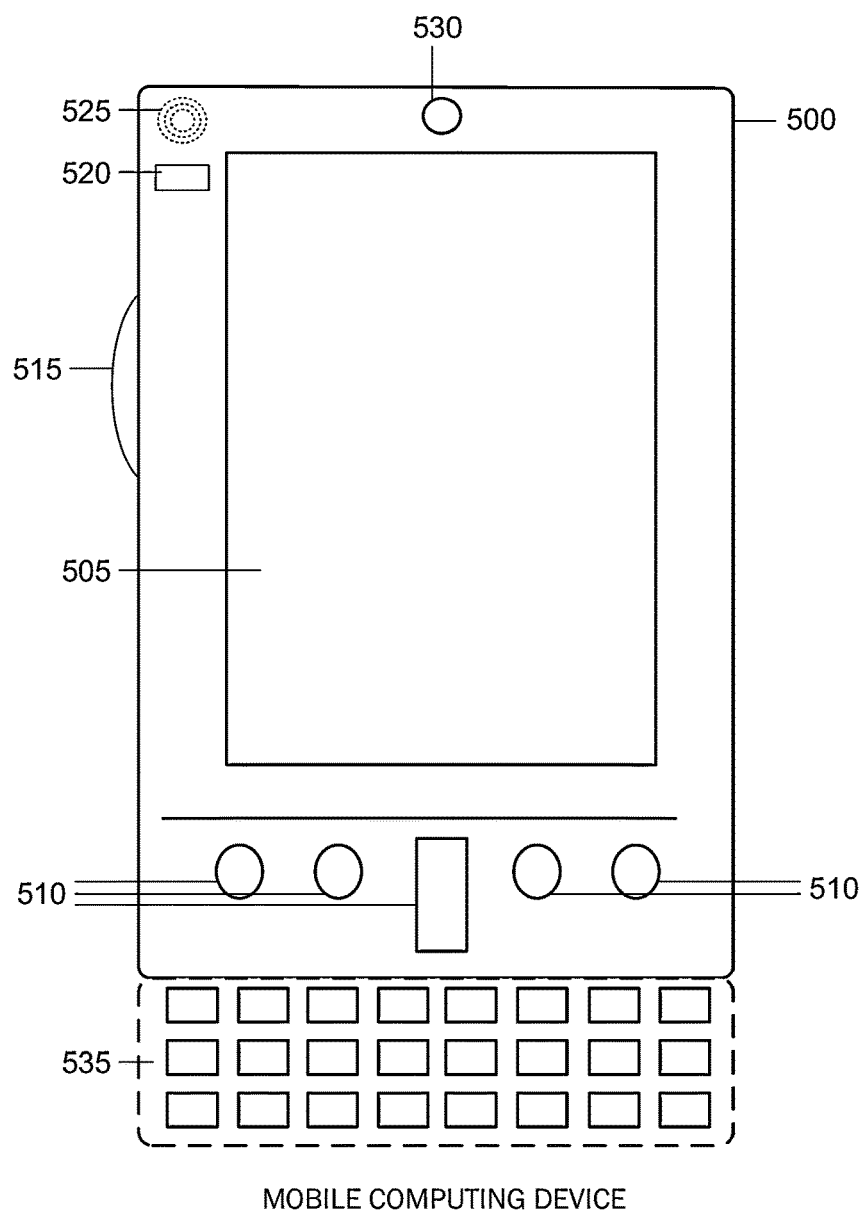
FIGS. 5A and 5B are simplified block diagrams of a mobile computing device with which embodiments of the present invention may be practiced.
Figure 5B:
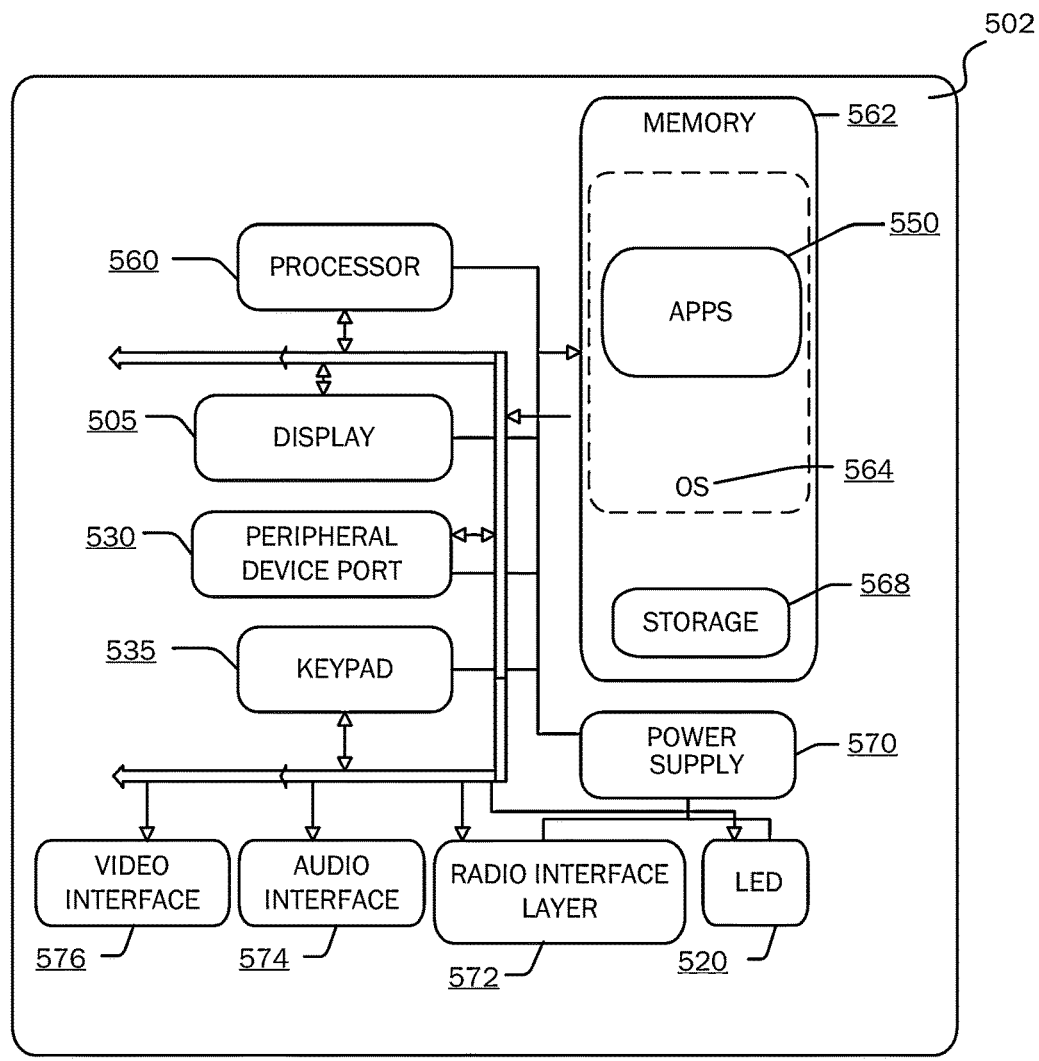
Figure 6:
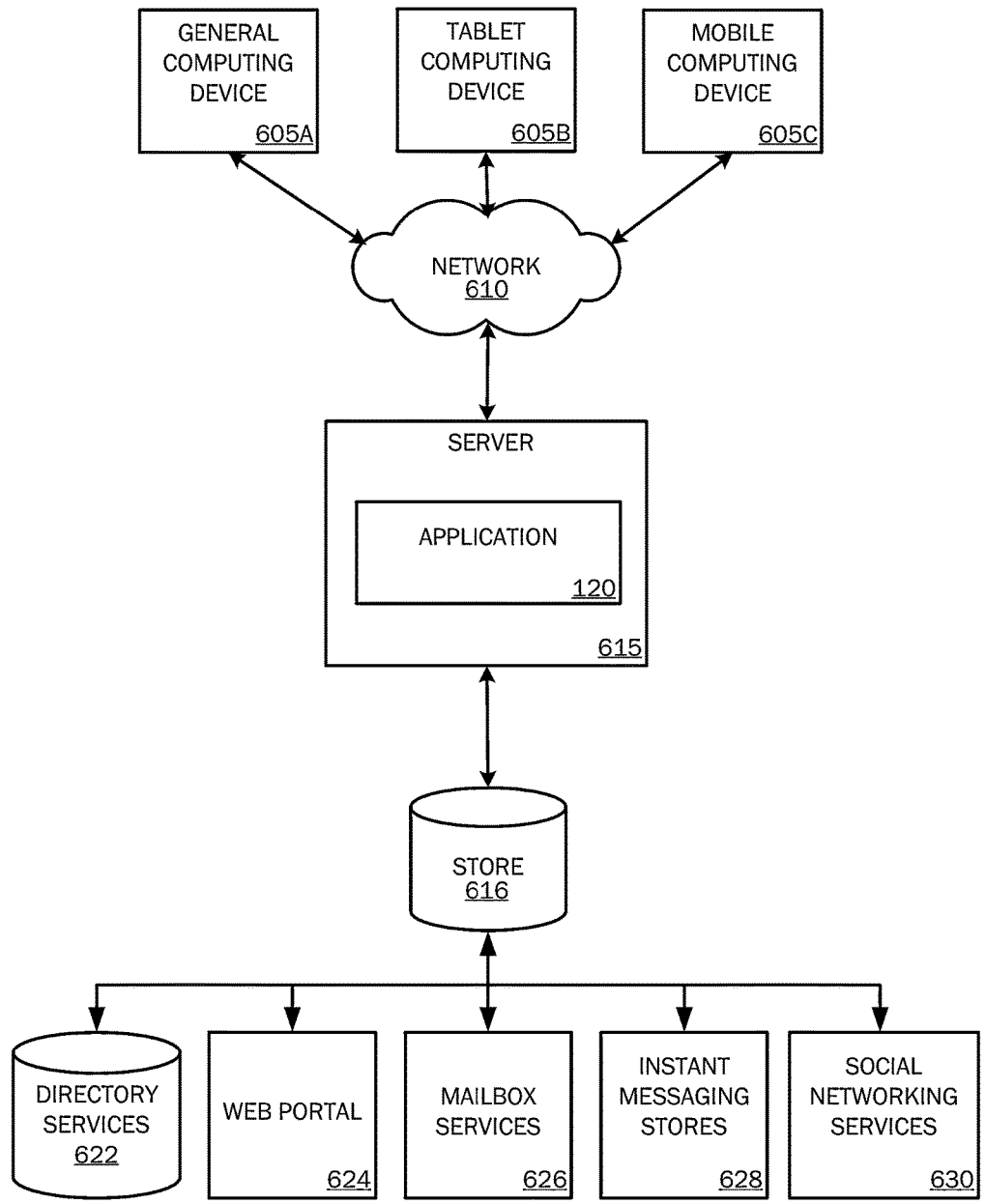
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 118 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 such as the aggregator 108, analytics engine 115, or client application 120. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing a personalized view of insights into social activity surrounding a content item 103 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 150 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing a personalized view of insights into social activity surrounding a content item, as described above. Content developed, interacted with, or edited in association with the application 120 may be stored in different communication channels or other storage types. For example, various documents may be stored using a directory service 622, a web portal 624, a mailbox service 626, an instant messaging store 628, or a social networking site 630. The application 120 may use any of these types of systems or the like for providing a personalized view of insights into social activity surrounding a content item, as described herein. A server 615 may provide the application 120 to clients 118. As one example, the server 615 may be a web server providing the application 120 over the web. The server 615 may provide the application 120 over the web to clients 118 through a network 610. By way of example, the client computing device 118 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing social activity insights, the method comprising:
   displaying a client application on a client device;
   receiving a request from a user to display a content item in the client application;
   in response to receiving the request, querying a graph to determine activities taken with respect to the content item by other users, and relationships between the user and the other users, the relationships including implicit and explicit relationships between the user and the other users, wherein at least one activity or relationship is weighted and at least one explicit relationship is defined according to an organization structure;
   determining one or more insights associated with the content item, the one or more insights identifying the activities taken with respect to the content item by the other users, wherein the one or more insights are personalized based on the user's relationships with the other users, and the determining is based on weighting of the at least one activity or relationship determined in the querying of the graph;
   generating a user interface for displaying the one or more insights to the user; and
   displaying the user interface in the client application, the user interface including a preview of the content item and the one or more insights presented in association with the preview of the content item.

2. The method of claim 1, further comprising:
   identifying one or more commonalities between activity data associated with the content item and relationship data or activity data associated with the user; and
   defining the one or more commonalities as one or more insights associated with the content item and relating to the user.

3. The method of claim 2, wherein:
   the querying comprises: querying the graph for activity edges connected to the content item persisted as a first node, and
   querying the graph for one or more of relationship edges or activity edges connected to the user persisted as a second node.

4. The method of claim 3, further comprising:
   calculating weights for the activity edges according to one or more of:
   a type of activity performed;
   a type of relationship the user has with an individual performing the activity;
   how recently the activity was performed; or
   a number of times the activity was performed; and
   ranking the activity edges according to the calculated weights.

5. The method of claim 4, wherein determining one or more insights associated with the content item comprises determining a predetermined or selected number of top ranking activity edges according to the calculated weights.

6. The method of claim 2, wherein identifying one or more commonalities between the activity data associated with the content item and the relationship data or activity data associated with the user comprises identifying whether an individual with whom the user has an explicit or an implicit relationship has acted on the content item.

7. The method of claim 6, wherein identifying whether an individual with whom the user has an explicit or an implicit relationship has acted on the content item comprises identifying whether an individual with whom the user has an explicit or an implicit relationship has performed one or more of:
   viewed the content item;
   liked the content item;
   followed the content item;
   shared the content item; or
   commented on the content item.

8. The method of claim 2, wherein the activity data and the relationship data are aggregated from a plurality of information sources.

9. The method of claim 1, wherein generating a user interface for displaying the one or more insights to the user comprises surfacing one or more search queries as one or more selectable tags.

10. The method of claim 9, further comprising:
   receiving an indication of a selection of a tag;
   searching for one or more content items matching parameters of the selected tag; and
   if one or more content items matching parameters of the selected tag are found, displaying the one or more content items matching parameters of the selected tag and insights in a user interface.

11. The method of claim 1, further comprising displaying one or more properties associated with the content item, the one or more properties comprising one or more of:
   a number of views;
   a number of likes;
   a number of followers; or
   a number of comments.

12. The method of claim 11, further comprising providing one or more functionalities for acting on the content item without switching context.

13. A system for providing social activity insights, the system comprising:
   one or more processors; and
   a memory coupled to the one or more processors, the one or more processors operable to:
      display a client application on a client device;
      receive a request from a user to display a content item in the client application;
      in response to receiving the request, query a graph to determine activities taken with respect to the content item by other users, and relationships between the user and the other users, the relationships including implicit and explicit relationships between the user and the other users, wherein at least one activity or relationship is weighted and at least one explicit relationship is defined according to an organization structure;
      determine one or more insights associated with the content item, based on an activity and relationship associated with the user, the one or more insights identifying the activities taken with respect to the content item by the other users, wherein the one or more insights are personalized based on the user's relationships with the other users, and determining of the one or more insights is based on weighting of the at least one activity or relationship determined in querying of the graph;
      generate a user interface for displaying the one or more insights to the user; and
      display the user interface in the client application, the user interface including a preview of the content item and the one or more insights presented in association with the preview of the content item.

14. The system of claim 13, wherein in determining one or more insights associated with the content item and relating to the user, the one or more processors are operable to:
   query the graph for activity edges connected to the content item persisted as a first node;
   query the graph for one or more of relationship edges or activity edges connected to the user persisted as a second node;
   identify one or more commonalities between the activity edges connected to the first node and the relationship data or activity edges connected with the second node; and
   defining the one or more commonalities as one or more insights associated with the content item and relating to the user.

15. The system of claim 14, wherein the one or more processors are further operable to:
   calculate weights for the activity edges according to one or more of:
      a type of activity performed;
      a type of relationship the user has with an individual performing the activity;
      how recently the activity was performed; or
      a number of times the activity was performed;
   rank the activity edges according to the calculated weights;
   determine a predetermined or selected number of top ranking activity edges according to the calculated weights; and
   define the predetermined or selected number of top ranking activity edges as the one or more insights.

16. The system of claim 13, wherein in generating a user interface for displaying the one or more insights to the user, the one or more processors are further operable to:
   surface one or more search queries as one or more selectable tags, wherein the one or more selectable tags comprise user-generated tags or automatically suggested tags;
   receive an indication of a selection of a tag;
   search for one or more content items matching parameters of the selected tag; and
   if one or more content items matching parameters of the selected tag are found, display the one or more content items and insights associated with the one or more content items in a user interface.

17. A computer readable medium containing computer executable instructions which, when executed by a computer, perform a method for providing social activity insights, the method comprising:
   displaying a client application on a client device;
   receiving a request from a user to display a content item in the client application;
   in response to receiving the request, querying a graph for activity edges connected to a first node associated with the content item, the activity edges identifying activities taken with respect to the content item by other users;

querying the graph for one or more of relationship edges or activity edges connected to a second node associated with a user, the relationship edges identifying implicit and explicit relationships between the user and the other users, wherein at least one activity or relationship is weighted and at least one explicit relationship is defined according to an organization structure;

identifying one or more commonalities between the activity edges connected to the first node and the relationship edges or activity edges connected to the second node; and defining the one or more commonalities as one or more insights associated with the content item and relating to the user interacting with the content item, wherein the defining is based on weighting of the at least one activity or relationship determined in querying of the graph;

generating a user interface for displaying the one or more insights to the user;

displaying the user interface in the client application, the user interface including a preview of the content item and the one or more insights presented in association with the preview of the content item; and displaying one or more properties associated with the content item, the one or more properties comprising one or more of:
  a number of views;
  a number of likes;
  a number of followers; or
  a number of comments.

18. The computer readable medium of claim 17, wherein defining the one or more commonalities as one or more insights associated with the content item and relating to the user comprises:
  calculating weights for the activity edges according to one or more of:
    a type of activity performed;
    a type of relationship the user has with an individual performing the activity;
    how recently the activity was performed; or
    a number of times the activity was performed;
  ranking the activity edges according to the calculated weights; and
  defining a predetermined or selected number of top ranking activity edges as the one or more insights according to the calculated weights.

19. The computer readable medium of claim 17, further comprising providing one or more functionalities for acting on the content item without switching context, the one or more functionalities enabling the user to:
  view the content item;
  like the content item;
  mark the content item as a favorite;
  share the content item; or
  comment on the content item.

20. The computer readable medium of claim 17, further comprising displaying one or more selectable tags identifying the one or more insights, wherein selection of one of the one or more selectable tags causes a search query to be performed for the insight associated with the one of the one or more selectable tags, and wherein at least one of the insights highlights activity associated with users with whom the user has a connection.

\* \* \* \* \*